June 1, 1926.
W. PARKE
OVEN SHELF HANDLE
Filed Feb. 25, 1926
1,587,350
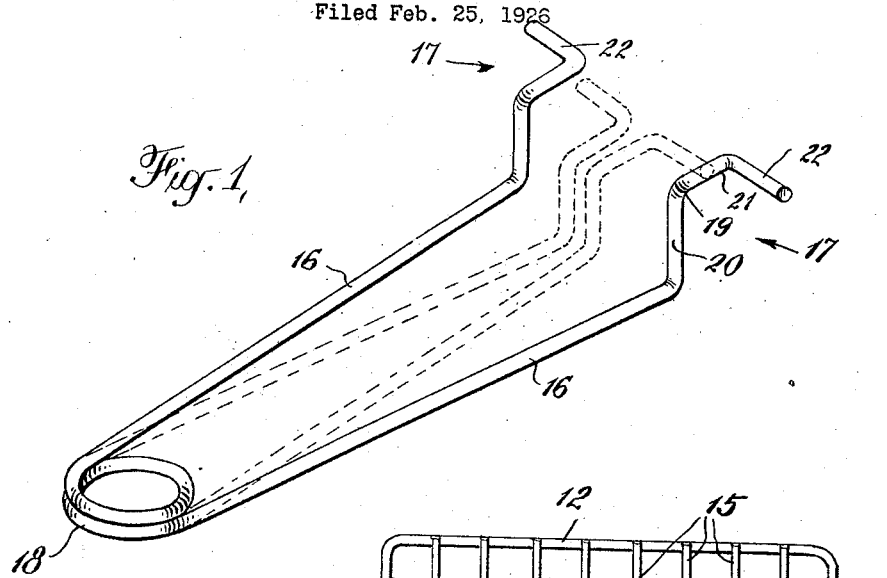
Fig. 1,
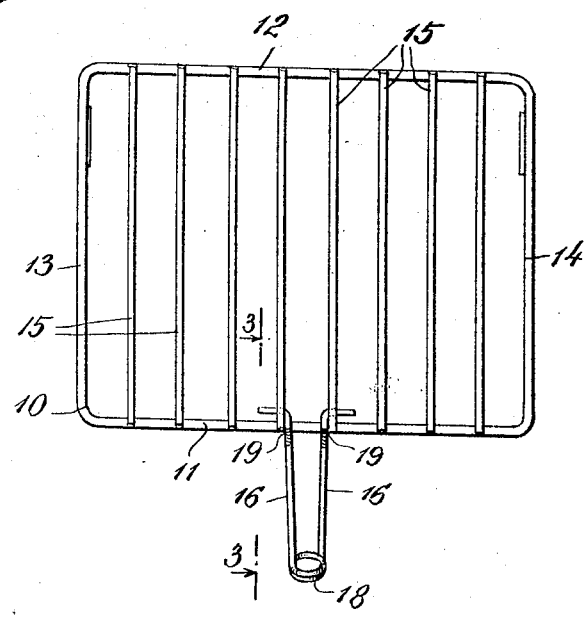
Fig. 2,
Fig. 3.
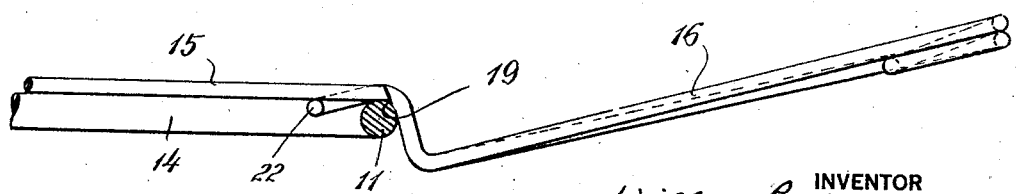
INVENTOR
William Parke
BY
Pennie, Davis, Marvin & Edmonds
his ATTORNEYS Patented June 1, 1926.

1,587,350

UNITED STATES PATENT OFFICE.

WILLIAM PARKE, OF NEW YORK, N. Y., ASSIGNOR TO WILLIAM PARKE, INCORPORATED, OF WILMINGTON, DELAWARE, A CORPORATION OF DELAWARE.

OVEN-SHELF HANDLE.

Application filed February 25, 1926. Serial No. 90,454.

This invention relates to handles for oven shelves and has for its object the provision of a handle of improved construction which affords a complete control of the shelf, and which is simple in structure, convenient to use, light in weight, and low in cost of manufacture.

In carrying on baking or roasting operations in domestic ovens it is frequently necessary to inspect the food while it is cooking and this is usually done at present either by removing the individual cooking receptacles, or the oven shelf upon which they rest, entirely from the oven, or, in an oven which is equipped with a drop door forming a shelf when open, to such shelf. In either case it is customary to use cloths, or "holders" for protecting the hands from the heat and the use of such means of protection necessarily results in an inadequate control over the articles being removed from the oven. As a consequence the hands are likely to be burned by contact with the hot receptacles or with parts of the stove itself.

By means of the present invention this danger is largely overcome by providing a tong-like handle of appropriate construction and by employing an oven shelf of suitable structure to be engaged by this handle so that by using one or more of the handles the oven shelf can be entirely removed from the oven under complete control. In devising a handle and oven shelf of this character it is important not only to provide a suitable coaction between the handle and the shelf to effect the lifting of the shelf, such as the ordinary stove lid lift working on the crow-bar principle, but in addition to such a lifting engagement to provide adequate means of simple arrangement which effectively prevents the handle from lateral angular movement with respect to the shelf, and maintains the handle firmly in a position where it projects perpendicularly from the edge of the shelf.

The present invention includes the constructing of a handle with a pair of coacting levers each provided with a jaw portion having a pocket on the under-side and a laterally projecting prong beyond this pocket, and the oven shelf is constructed with spaced transverse and longitudinal bars. The levers of the handle, when placed in operative relation to the shelf are spaced in relation to one another so as to effect a lifting connection with the shelf at two spaced points and thereby to afford a positive control of the shelf by the handle. The jaw portion of each lever engages the shelf with a crow-bar lifting action, the jaws passing over one of the transverse bars of the shelf and the laterally projecting prongs passing beneath a pair of the spaced longitudinal bars. The pockets referred to are provided one on each lever in proximity to the point of contact of the jaw portion with the transverse bar of the shelf, and are of appropriate construction to include an abutment which cooperates with the transverse bar to maintain the handle in perpendicular relation to the edge of the shelf. There is thus also provided a positive engagement with the shelf by which a sliding movement in either direction may be imparted to the shelf by means of the handle.

Because of the ability to slide the shelf by the handle, this handle may be conveniently employed with the improved oven support described in my copending application Serial No. 86,463, filed February 6, 1926. The invention will be better understood by referring to the accompanying drawings showing by way of example one embodiment thereof. In these drawings—

Fig. 1 is a perspective view of the handle, its releasing position being shown by dotted lines;

Fig. 2 is a plan view showing a shelf with the handle applied thereto; and

Fig. 3 is a section on the line 3—3 of Fig. 2 to illustrate in detail the connection between the handle and the shelf.

Referring now to the accompanying drawings the oven shelf itself, as shown in Figs. 2 and 3, has a rim portion 10 of metal rod or wire of suitable gauge to give the required strength, which is bent into rectangular or other appropriate shape to conform to the oven. This rim thus provides the front and rear transversely extending bars 11 and 12 respectively as well as transversely extending bars 13 and 14 which constitute the side edges of the shelf, the ends of the rim 10 being welded together so as to give strength by providing a continuous rim portion.

Longitudinally extending bars or rods 15 are secured at their ends to the front and rear bars 11 and 12. These longitudinal bars 15 may be secured in place by welding and are suitably spaced to provide a grid-like shelf which will serve as a convenient support for such cooking receptacles as are ordinarily placed within a domestic oven, and at the same time allow for the relatively free circulation of the heated air and vapors. These longitudinal bars may conveniently be of somewhat smaller gauge than the rim portion 10. Additional transverse bars may be provided in parallel relation to bars 11 and 12 if desired for the purpose of securing additional rigidity.

The handle for the shelf just described, as best shown in Fig. 1, comprises a pair of tong levers 16, each provided with jaw portions 17 at one end, and connected together at the other end by a spring 18 which acts to force apart the jaw portions. Each of the jaw portions 17 comprises a pocket or abutment 19 formed, in the example illustrated, by the right angular bends 20 and 21, and a laterally projecting prong 22 beyond the pocket 19 at the outer end of the jaw.

When the handle is applied to the shelf as may be seen in Figs. 2 and 3, the prongs 22 bear upwardly against the bottoms of a pair of adjacent longitudinal bars 15. The angular bends 20 and 21 forming the pocket 19 contact with the front and upper surfaces of the longitudinal bar 11 so as to positively engage this bar and hold the handle in extended position in perpendicular relation to the bar 11 when viewed from the top as shown in Fig. 2. Thus the jaw portions 17 engage the shelf with a crowbar like action and this action is supplemented by the coaction of pockets 19 with the bar 11 to hold the handle in positive engagement with the shelf so as to enable a sliding movement to be positively imparted to the shelf by the handle, as well as enabling the shelf to be lifted by the handle.

In bringing the handle into engagement with the shelf the levers 16 are squeezed together somewhat by the pressure of the hand so as to bring the levers into approximately the dotted position as shown in Fig. 1. The prongs 22 are of such length that when the levers 16 are squeezed together so that they touch one another; the ends of the prongs will not freely pass between adjacent bars 15, but by a slight twist of the handle, prongs 22 may be readily inserted beneath these bars. While this construction is not absolutely essential, it is desirable because in lifting the shelf when it is heavily loaded there may be a slight tendency to squeeze the arms 16 together, and by making the prongs 22 relatively long the likelihood of accidental disengaging of the handle from the shelf is substantially nil. Furthermore, this construction facilitates the placing of the handle upon the shelf because even a slight releasing of the levers 16 brings the ends of prongs 22 into coaction with the under-surfaces of the bars 15. The removal of the handle from the shelf is accomplished in a manner which is the reverse of that just described.

The oven shelf handle, because of its engagement with the shelf at spaced horizontal points, and because of the construction involving the pockets 19 and the prongs 22 enables the shelf to be conveniently and positively handled or controlled when it is desired to remove it from the oven. Moreover, the shelf being firmly engaged by the pockets 19 and prongs 22, can be slid in and out of the oven with precision so that the oven can be slid part way out if desired for an inspection during the baking operation. It will be noted by referring to Fig. 3 that the points of contact of the handle with the shelf are such that the levers 16 extend away from the shelf at an angle to the horizontal. By arranging the handle and shelf in this manner, danger of burning the hands is reduced when attempting to move a shelf that is situated close to the bottom of an oven which is provided with a drop door. The elevation of the levers 16 is such as to remove the hands from a position in close proximity to the hot surface of such an oven door shelf.

The handle is capable of being applied to the shelf with great facility and when applied, remains in the clamped or engaged position because the levers 16 are biased outwardly by the spring 18. The handle is, however, just as readily removed from the shelf. When it is desired to lift relatively long shelves or shelves which are too heavily loaded, two handles may be used, one near each side of the shelf. Both the handle and the oven shelf are of simple construction, light in weight and can be manufactured at relatively low cost.

I claim:

1. An oven shelf handle comprising a pair of coacting tong levers each having a jaw portion provided with a pocket on the underside and a laterally projecting prong therebeyond.

2. An oven shelf handle comprising an attenuated body curved into a spring at one end with the ends thereof projecting as tong levers urged apart by the spring, said ends each being bent at their tips to form pockets and laterally projecting prongs therebeyond comprising jaw portions for engaging a shelf having spaced longitudinal and transverse bars at spaced points for lifting the same.

In testimony whereof I affix my signature.

WILLIAM PARKE.